US011347282B2

(12) United States Patent
Sun et al.

(10) Patent No.: US 11,347,282 B2
(45) Date of Patent: May 31, 2022

(54) HARD DISK CARRIER

(71) Applicant: HONG FU JIN PRECISION INDUSTRY (WuHan) CO., LTD., Wuhan (CN)

(72) Inventors: Da-Long Sun, Shenzhen (CN); Yu-Gui Chen, Wuhan (CN); Nian-Yuan Yang, Wuhan (CN); Chung Chai, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 76 days.

(21) Appl. No.: 17/030,516

(22) Filed: Sep. 24, 2020

(65) Prior Publication Data
US 2021/0325946 A1    Oct. 21, 2021

Related U.S. Application Data

(63) Continuation-in-part of application No. PCT/CN2020/085191, filed on Apr. 16, 2020.

(51) Int. Cl.
*G06F 1/18* (2006.01)
*G11B 33/08* (2006.01)

(52) U.S. Cl.
CPC .............. *G06F 1/187* (2013.01); *G11B 33/08* (2013.01)

(58) Field of Classification Search
CPC ....................................................... G06F 1/187
See application file for complete search history.

(56) References Cited

U.S. PATENT DOCUMENTS 9,648,775 B2 * 5/2017 Chen .................... H05K 7/1417
10,074,403 B2 * 9/2018 Chen ...................... G06F 1/187

FOREIGN PATENT DOCUMENTS

CN          110597361 A    12/2019

* cited by examiner

*Primary Examiner* — Jerry Wu
(74) *Attorney, Agent, or Firm* — ScienBiziP, P.C.

(57) ABSTRACT

A hard disk carrier includes a tray bracket and a turnover bracket rotatably arranged on the tray bracket. The tray bracket includes a first side wall, a second side wall parallel to the first side wall, and a bottom wall connecting the first side wall and the second side wall. wherein The turnover bracket includes two turnover arms rotatably arranged on the bottom wall between a first angle at which the turnover arms being received in the bottom wall and a first receiving space is defined between the first side wall and the second side wall and a second angle at which the turnover arms turns out from the bottom wall and a second receiving space is defined between the two turnover arms. A size of the second receiving space is different from that of the first receiving space.

11 Claims, 4 Drawing Sheets

HARD DISK CARRIER

FIELD

The subject matter herein generally relates to electronic equipment and particularly relates to a hard disk carrier and an electronic device.

BACKGROUND

At present, many electronic devices on the market use a hard disk for data storage. In general, there are two kinds of hard disk: 3.5-inch hard disk and 2.5-inch hard disk. It is often necessary to replace the hard disk. Different hard disk carriers are needed to carry two kinds of hard disks with different dimensions. Therefore, when replacing a hard disk, a corresponding hard disk carrier also needs to be replaced. It is time-consuming. Further, it is troublesome to store the replaced hard disk.

BRIEF DESCRIPTION OF THE DRAWINGS

Implementations of the present disclosure will now be described, by way of embodiment, with reference to the attached figures.

DETAILED DESCRIPTION

Figure 1:
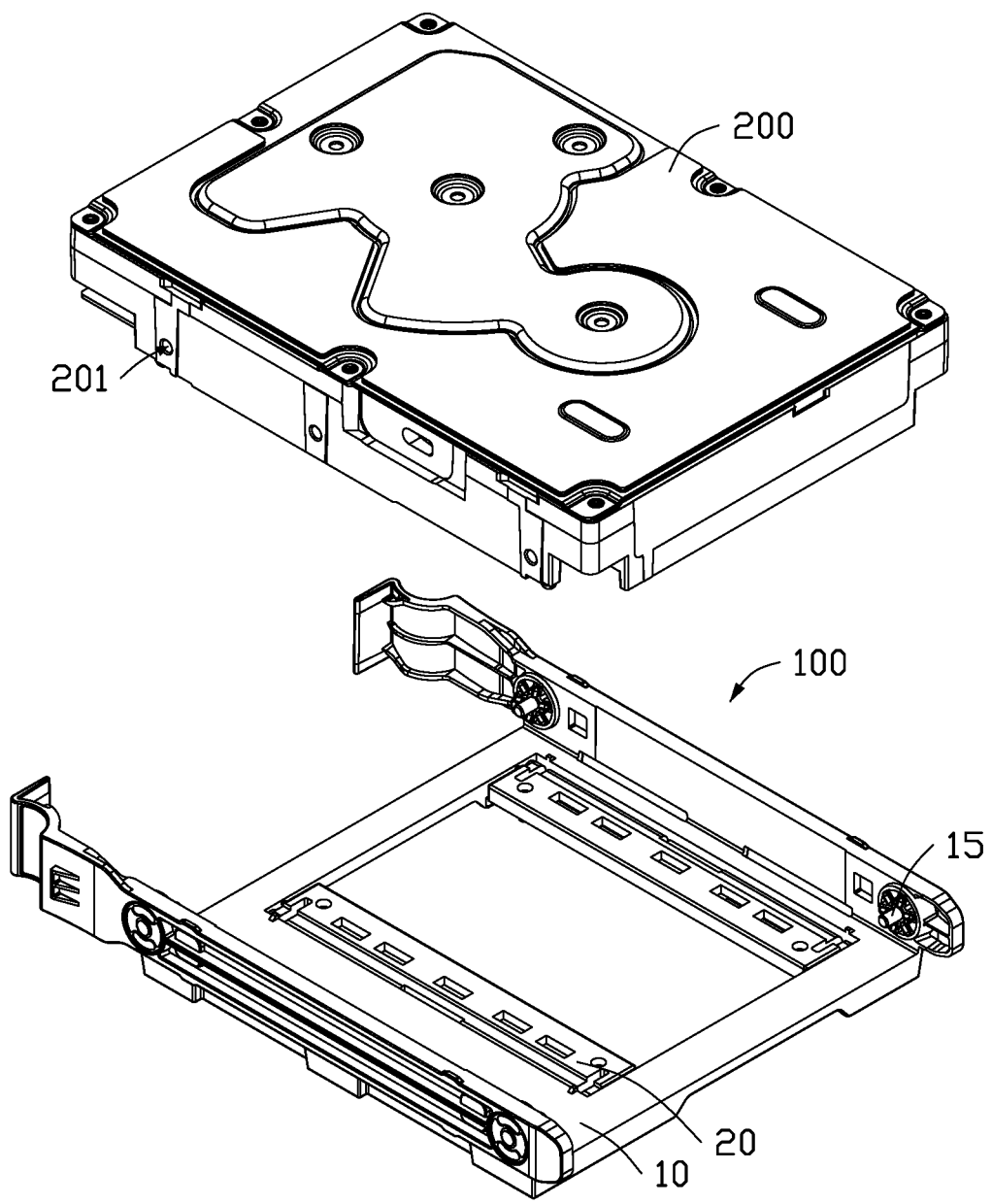
FIG. 1 is a schematic diagram of a hard disk carrier and a first hard disk according to an embodiment of the present disclosure.

The embodiments of the present disclosure will be described clearly and completely below in combination with the accompanying drawings. Obviously, the described embodiment is only part of the embodiments of the present disclosure, not all of the embodiments. Based on the embodiments in the present disclosure, all other embodiments obtained by those skilled in the art without creative labor belong to the protection scope of the present application.

It should be noted that if a component is called "fixed" to another component, it can be directly or indirectly fixed to another component or indirectly fixed to another component by an intermediate component. If a component is considered to "connect" to another component, it can be directly connected to another component or indirectly connected to another component by an intermediate component. When a component is considered to be "arranged" on another component, it can be arranged directly to another component or indirectly arranged on another component by an intermediate component. The terms "vertical", "horizontal", "left", "right" and similar expressions indicating directions or positions are based on the directions or positions shown in the attached drawings in order to facilitate the description of the embodiment and simplify the description of the invention, rather than indicating or implying that the device or element referred to must have a specific orientation, be constructed and operated in a specific orientation, it cannot be understood as a limitation of the embodiment of the invention.

Unless otherwise defined, all technical and scientific terms used in the present disclosure have the same meanings as those generally understood by those skilled in the technical field of the application. The terms used in the specification of the present application are only for the purpose of description and are not intended to limit the present application. The term "or/and" used in the present disclosure includes any one of and all combinations of two or more related listed items.

The present disclosure provides a hard disk carrier. The hard disk carrier includes a tray bracket and a turnover bracket arranged on the tray bracket. The tray bracket includes a first side wall, a second side wall, and a bottom wall connecting the first side wall and the second side wall. The first side wall and the second side wall are substantially parallel to each other. The turnover bracket includes two turnover arms rotatably arranged on the bottom wall. When the turnover arms are turned to a first preset angle, the turnover arms can be fully accommodated in the bottom wall. A first receiving space for receiving a first hard disk is formed between the first side wall and the second side wall. When the turnover arms are turned to a second preset angle, a second receiving space for a second hard disk is formed between the two turnover arms. The first receiving space and the second receiving space is in different sizes so as to receive hard disks in different sizes.

Figure 2:
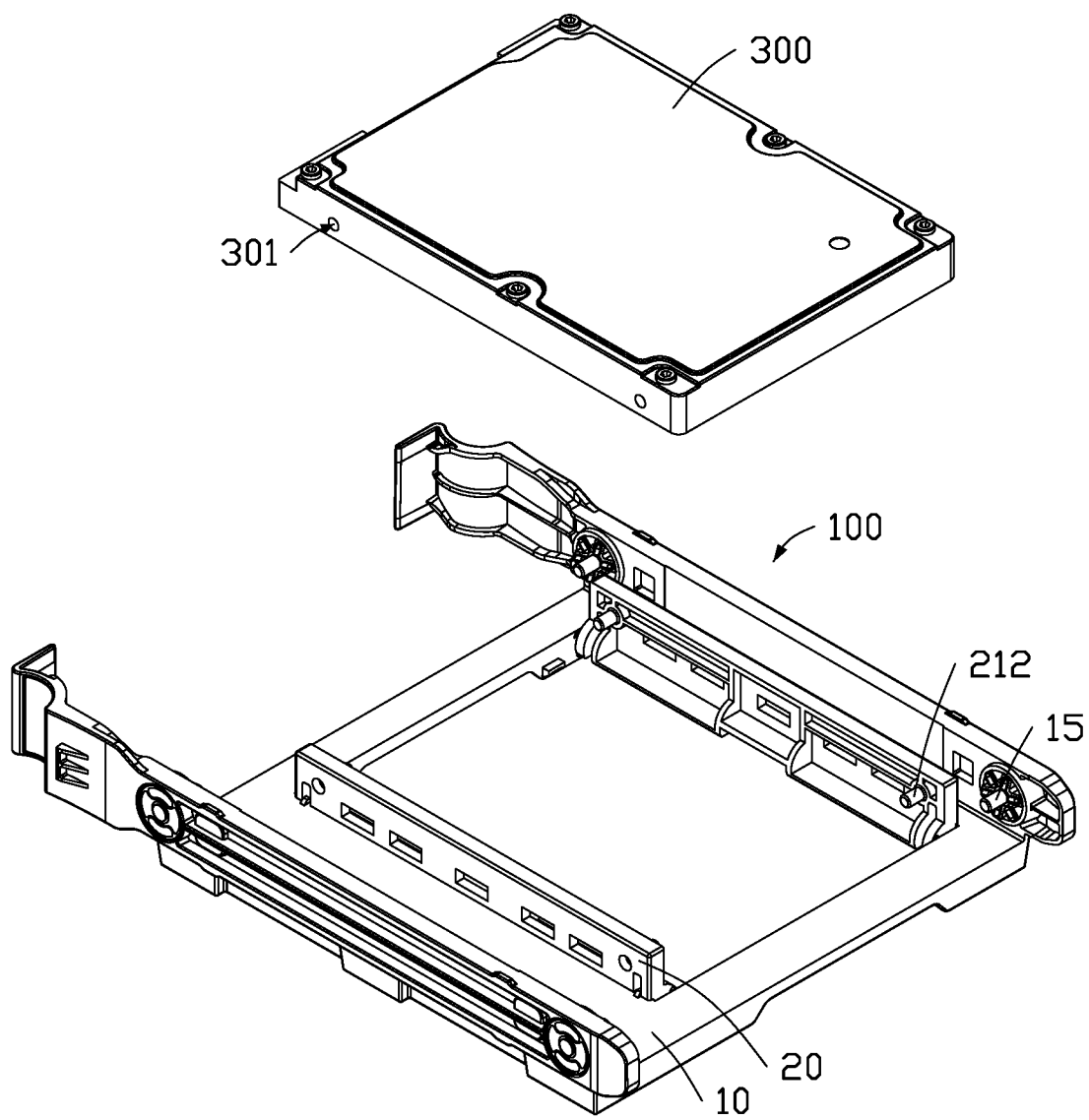
FIG. 2 is a schematic diagram of a hard disk carrier and a second hard disk according to an embodiment of the present disclosure.

Referring to FIGS. 1 and 2, an embodiment of the present disclosure provides a hard disk carrier 100. The hard disk carrier 100 provides receiving spaces with different sizes so as to receive hard disks in different sizes. The hard disk carrier 100 includes a tray bracket 10 and a turnover bracket 20 rotatably arranged on the tray bracket 10. When the turnover bracket 20 rotates to be accommodated in the tray bracket 10, the hard disk carrier 100 can install a first hard disk 200 with a larger size, such as a 3.5-inch hard disk; when the turnover bracket 20 is turned out from the tray bracket 10, the hard disk carrier 100 can install a second hard disk 300 with a smaller size, such as a 2.5-inch hard disk.

Figure 3:
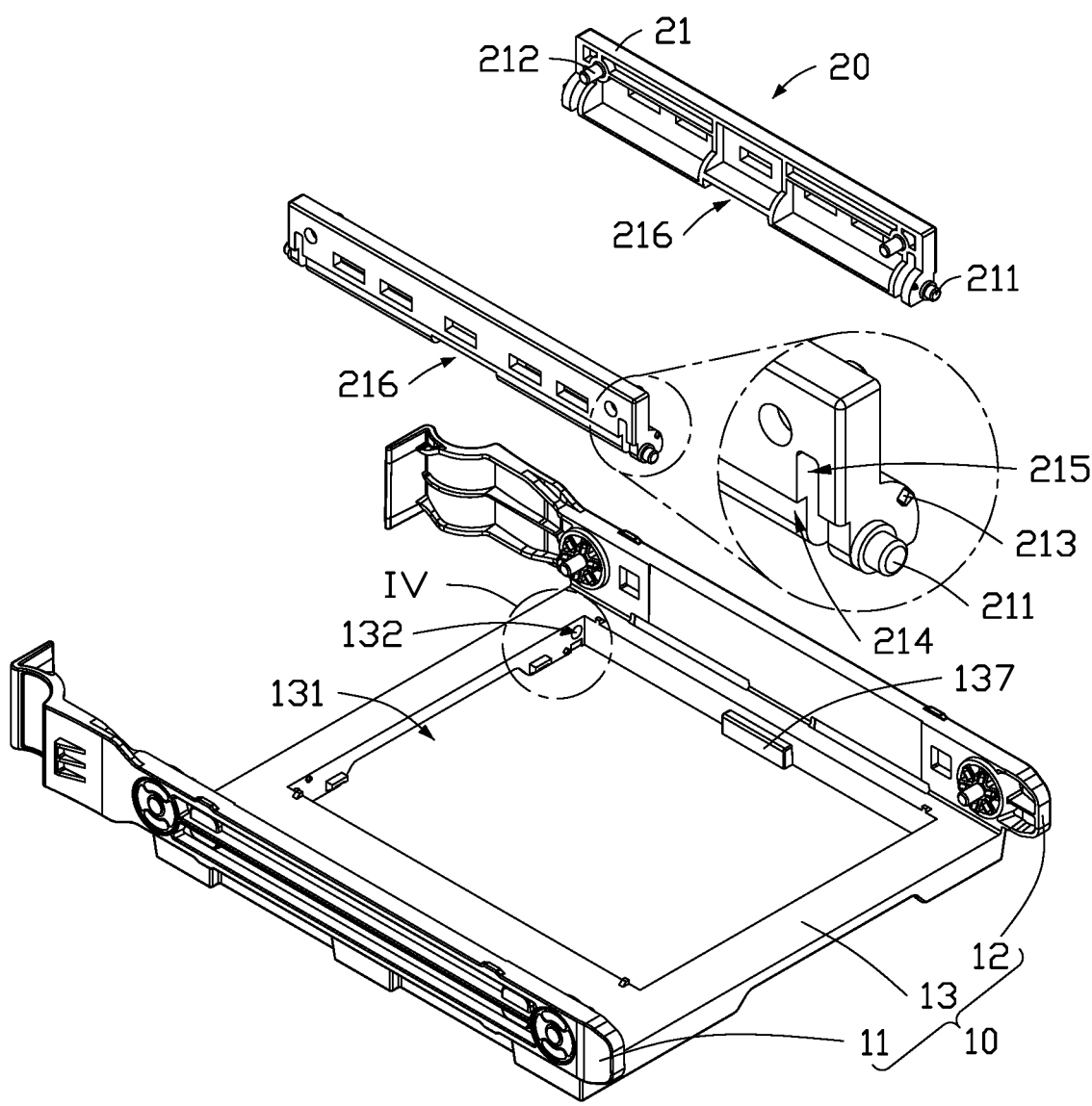
FIG. 3 is a partially exploded view of the hard disk carrier of FIG. 2.
Figure 4:
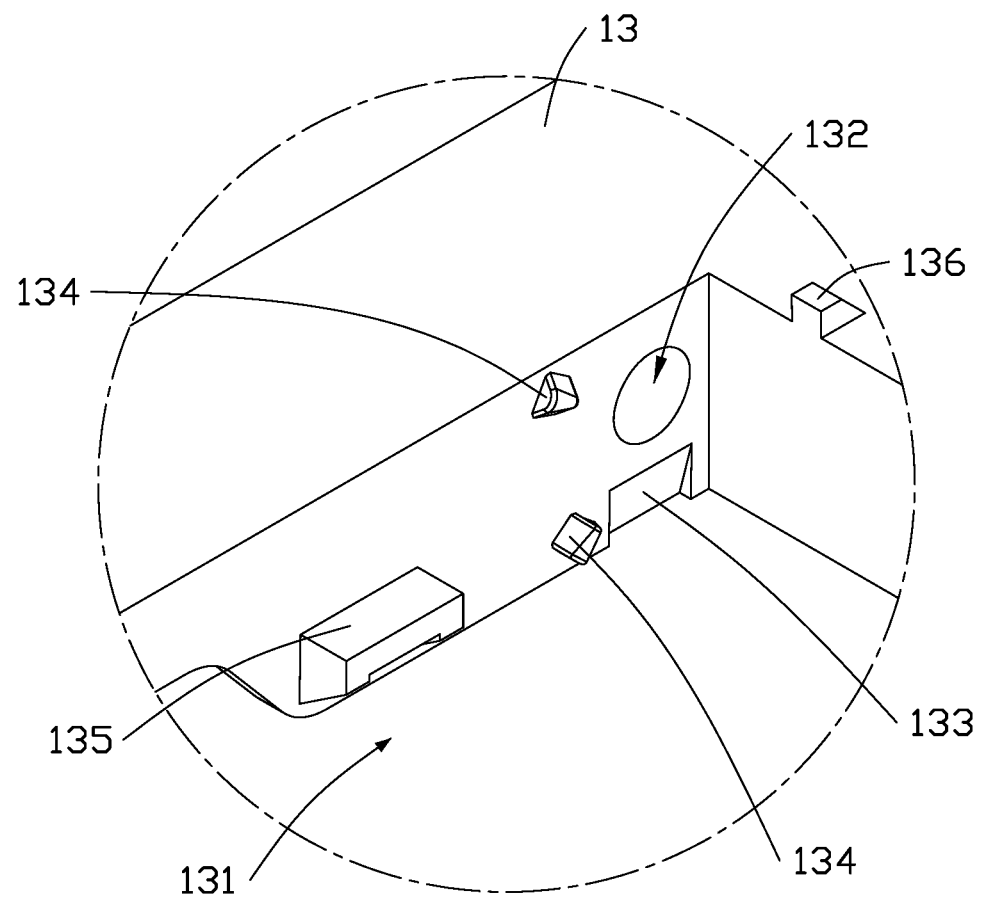
FIG. 4 is an enlarged view of the IV portion of the hard disk carrier of FIG. 3.

Please refer to FIGS. 3 and 4, and the tray bracket 10 includes a first side wall 11, a second side wall 12, and a bottom wall 13 connecting the first side wall 11 and the second side wall 12. The first side wall 11 is parallel to the second side wall 12. A first receiving space for installing the first hard disk 200 is formed between the first side wall 11 and the second side wall 12. Each of the first side wall 11 and the second side wall 12 is respectively provided with a first position pin 15. The first position pins 15 are configured to cooperate with first position holes 201 on the first hard disk 200 so as to fix the first hard disk 200.

In at least one embodiment, the number of the first position pins 15 are four, two of the first position pins 15 are arranged on the first side wall 11, and the other two are arranged on the second side wall 12. Correspondingly, the first hard disk 200 defines two first position holes 201 at each of two opposite sides thereof respectively. A distance between the first side wall 11 and the second side wall 12 is equal to a width of the first hard disk 200.

The bottom wall 13 is recessed to define a turnover opening 131 configured to receive the turnover bracket 20.

In detail, the turnover bracket 20 includes two turnover arms 21. Each of the two turnover arms 21 is provided with two rotate shafts 211 at two opposite ends thereof. The sidewalls surrounding the turnover opening 131 defines rotate holes 132 corresponding to rotate shafts 211 respectively. The rotate shafts 211 can be rotatably received in the rotate holes 132 so that the two turnover arms 21 can rotate to be received in the turnover opening 131 or rotate to be out from the turnover opening 131.

When the turnover arms 21 rotates to be out from the turnover opening 131, the two turnover arms 21 form a second receiving space for receiving the second hard disk 300. Each of the turnover arms 21 is provided with a second position pin 212 protruding towards the second receiving space. The second position pins 212 are configured to cooperate with second position holes 301 defined in the second hard disk 300 to fix the second hard disk 300. In at least one embodiment, when the turnover arms 21 rotates to a first angle (for example, where an angle between the turnover arms 21 and the bottom wall 13 is substantially zero, the turnover arms 21 are totally received in the turnover opening 131, and the hard disk carrier 100 can be used to install the first hard disk 200. When the turnover arms 21 rotates to a second angle (for example, where an angle between the turnover arms 21 and the bottom wall 13 is substantially 90 degree, the turnover arms 21 rotates out from the turnover opening 131, and the hard disk carrier 100 can be used to install the second hard disk 300.

In at least one embodiment, the number of the second position pins 212 is four. Two of the four position pins 212 are arranged in one of the two turnover arms 21, and the other two of the four position pins 212 are arranged in the other one of the two turnover arms 21. Correspondingly, the second hard disk 300 defines two second position holes 301 at each of two opposite sides thereof. A distance between the two turnover arms 21 is equal to a width of the second hard disk 300 when the two turnover arms 21 rotates to the second angle.

The sidewalls surrounding the turnover opening 131 further defines a notch 133 adjacent to the rotate hole 132. The notch 133 is sloping structured which includes a sloping surface. The rotate shafts 211 of the turnover arms 21 can be guided into the rotate holes 132 through the sloping surface. Therefore, the notch 133 can facilitate the rotate shafts 211 of the turnover arms 21 entering the rotate holes 132 smoothly.

In at least one embodiment, at least one positioning element 134 is arranged near each rotate hole 132. In at least one embodiment, the number of the at least one positioning element 134 is two, and two positioning elements 134 are arranged around the rotate hole 132. Two stop elements 213 are respectively arranged on two opposite ends of the turnover arm 21 near the rotate shaft 211. A distance between each stop element 213 and corresponding rotate shaft 211 is substantially equal to a distance between each positioning element 134 and corresponding rotate hole 132. When the turnover arm 21 rotates, the positioning element 134 can cooperate with the stop element 213 to position the turnover arm at a preset angle, therefore, the first hard disk 200 or the second hard disk 300 can be installed on the hard disk carrier 100.

In at least one embodiment, a limit part 135 is arranged on the sidewall surrounding the turnover opening 131. When the turnover arms 21 rotate into the turnover opening 131, The limit part 135 is configured to resist against the turnover arms 21, therefore stopping the turnover arms 21 to further rotate.

In at least one embodiment, each of the turnover arms 21 is provided with a stop part 214. The stop part 214 is arranged on a side of the turnover arm 21 away from the second position pin 212. When the turnover arm 21 turns out from the turnover opening 131, the stop part 214 is configured to stop further rotating of the turnover arm 21. In such circumstances, one of the two positioning elements 134 away from the limit part 135 cooperates with the stop element 213 to prevent the turnover arm 21 to turn back into the turnover opening 131. Thus, the turnover arm 21 is positioned at the second angle and the hard disk carrier 100 can be used to install the second hard disk 300.

In at least one embodiment, the stop part 214 is a step. When the turnover arm 21 turns out from the turnover opening 131, the stop part 214 resists against a top surface of the bottom wall 13 to prevent the turnover arm 21 from further rotating. At this time, the stop part 214 can be used as a support for the turnover arm 21.

In at least one embodiment, there is a cushion structure 215 arranged adjacent to the rotate shaft 211. The cushion structure 215 is configured to be deformed to damp pressure applied on the rotate shaft 211 and provide restoring force to prevent the rotate shaft 211 from going out from the rotate hole 132.

In at least one embodiment, the cushion structure 215 can be a gap. When the rotate shaft 211 is applied a force, it can deform towards the gap. When the force is removed, the rotate shaft 211 can return to its original position.

In at least one embodiment, a protrusion 136 is formed at the bottom wall 13 corresponding to the gap. When the turnover arm 21 turns out from the turnover opening 131 to the second angle, the protrusion 136 can be inserted into the gap to prevent the rotate shaft 211 from going out from the rotate hole 132.

In at least one embodiment, the turnover arm 21 defines a recess 216, and the bottom wall 13 is provided a protuberance 137 corresponding to the recess 216. When the turnover arm 21 turns out from the turnover opening 131 to the second angle, the protuberance 137 can be received in the recess 216 to damp a force applied on the turnover arm 21 by the bottom wall 13.

In at least one embodiment, the number of the turnover opening 131 can be two, and each of them is configured to receive a corresponding turnover arm 21.

The first hard disk 200 can be fixed between the first side wall 11 and the second side wall 12 of the hard disk carrier 100. The second hard disk 300 can be fixed between two turnover arms 21 which are turned out from the turnover opening 131. Therefore, the hard disk carrier 100 can be used for installing different kinds of hard disks. The hard disk carrier is simple structured and easy to operate.

What is claimed is:

1. A hard disk carrier, comprising: a tray bracket, wherein the tray bracket comprises a first side wall, a second side wall parallel to the first side wall, and a bottom wall connecting the first side wall and the second side wall; and a turnover bracket rotatably arranged on the tray bracket, wherein the turnover bracket comprises two turnover arms rotatably arranged on the bottom wall between a first angle at which the turnover arms being received in the bottom wall and a first receiving space is defined between the first side wall and the second side wall and a second angle at which the turnover arms turns out from the bottom wall and a second receiving space is defined between the two turnover arms, a size of the second receiving space is different from that of the first receiving space; wherein each of the first side wall and the second side wall defines a first position pin configured to position a first hard disk of a first size; and each of the two turnover arms defines a second position pin configured to position a second hard disk of a second size; and a limit part is arranged on the sidewall surrounding the turnover opening and configured to resist against the turnover arms from further rotating along a first direction towards the turnover opening.

2. The hard disk carrier according to claim 1, wherein the bottom wall defines a turnover opening for receiving the turnover bracket, each of the turnover arms forms two rotate shafts respectively at two opposite ends thereof, sidewalls surrounding the turnover opening defines two opposite rotate holes corresponding to two rotate shafts respectively.

3. The hard disk carrier according to claim 2, wherein the sidewalls surrounding the turnover opening defines a notch near the rotate hole, and the notch is sloping structured capable of guiding the rotate shaft into the rotate hole.

4. The hard disk carrier according to claim 1, wherein each of the turnover arms is provided with a stop part configured to stop further rotating of the turnover arm along a second direction away from the turning opening.

5. The hard disk carrier according to claim 4, wherein each rotate arm defines a stop element adjacent to the rotate shaft, and the sidewalls surrounding the turnover opening forms a first positioning element to cooperate with the stop element to prevent the turnover arm from rotating along the second direction when the turnover arm is at the first angle.

6. The hard disk carrier according to claim 5, wherein the sidewalls surrounding the turnover opening forms a second positioning element to cooperate with the stop element to prevent the turnover arm from rotating along the first direction when the turnover arm is at the second angle.

7. The hard disk carrier according to claim 4, wherein stop part is a step configured to resist against a top surface of the bottom wall to prevent the turnover arm from further rotating along the second direction.

8. The hard disk carrier according to claim 1, wherein a cushion structure is arranged adjacent to each rotate shaft and configured to damp pressure applied on the rotate shaft.

9. The hard disk carrier according to claim 8, wherein the cushion structure is a gap, and when the rotate shaft is configured to be deformed towards the gap when being applied a force thereon and to return to its original position when the force is removed.

10. The hard disk carrier according to claim 9, wherein a protrusion is formed at the bottom wall corresponding to the gap and configured to be inserted into the gap to prevent the rotate shaft from going out from the rotate hole when the turnover arm turns out from the turnover opening to the second angle.

11. The hard disk carrier according to claim 8, wherein the turnover arm defines a recess, and the bottom wall is provided a protuberance corresponding to the recess, when the turnover arm turns out from the turnover opening to the second angle, the protuberance can be received in the recess.

* * * * *